US006548200B2

United States Patent
Breault

(10) Patent No.: US 6,548,200 B2
(45) Date of Patent: Apr. 15, 2003

(54) COLD STARTING OF GASOLINE FUELED FUEL CELL

(75) Inventor: Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/832,275

(22) Filed: Apr. 10, 2001

(65) Prior Publication Data

US 2002/0146609 A1 Oct. 10, 2002

(51) Int. Cl.$^7$ ............................................. H01M 8/04
(52) U.S. Cl. ............................ 429/26; 429/13; 429/22
(58) Field of Search ................................ 429/12, 13, 20, 429/22, 24, 26

(56) References Cited

U.S. PATENT DOCUMENTS 6,274,259 B1 * 8/2001 Grasso et al. ............... 429/13
6,331,366 B1 * 12/2001 Van Dine et al. ........... 429/17

* cited by examiner

Primary Examiner—Patrick Ryan
Assistant Examiner—M. Wills
(74) Attorney, Agent, or Firm—M. P. Williams

(57) ABSTRACT

A fuel cell power plant has a fuel cell (38) receiving hydrogen (37) from a fuel processing system (12) which employs a vaporizer (19) to vaporize clean gasoline from a source (13). A conventional start burner (22) and startup heat exchanger (28) are utilized to convert water (31) from the fuel processing system (12) and fuel cell (38) into steam (32); but during sub-zero startup, an aqueous antifreeze solution (46) is provided to the heat exchanger (28) to produce the steam (32) for starting the vaporization of gasoline in the vaporizer (19).

2 Claims, 1 Drawing Sheet

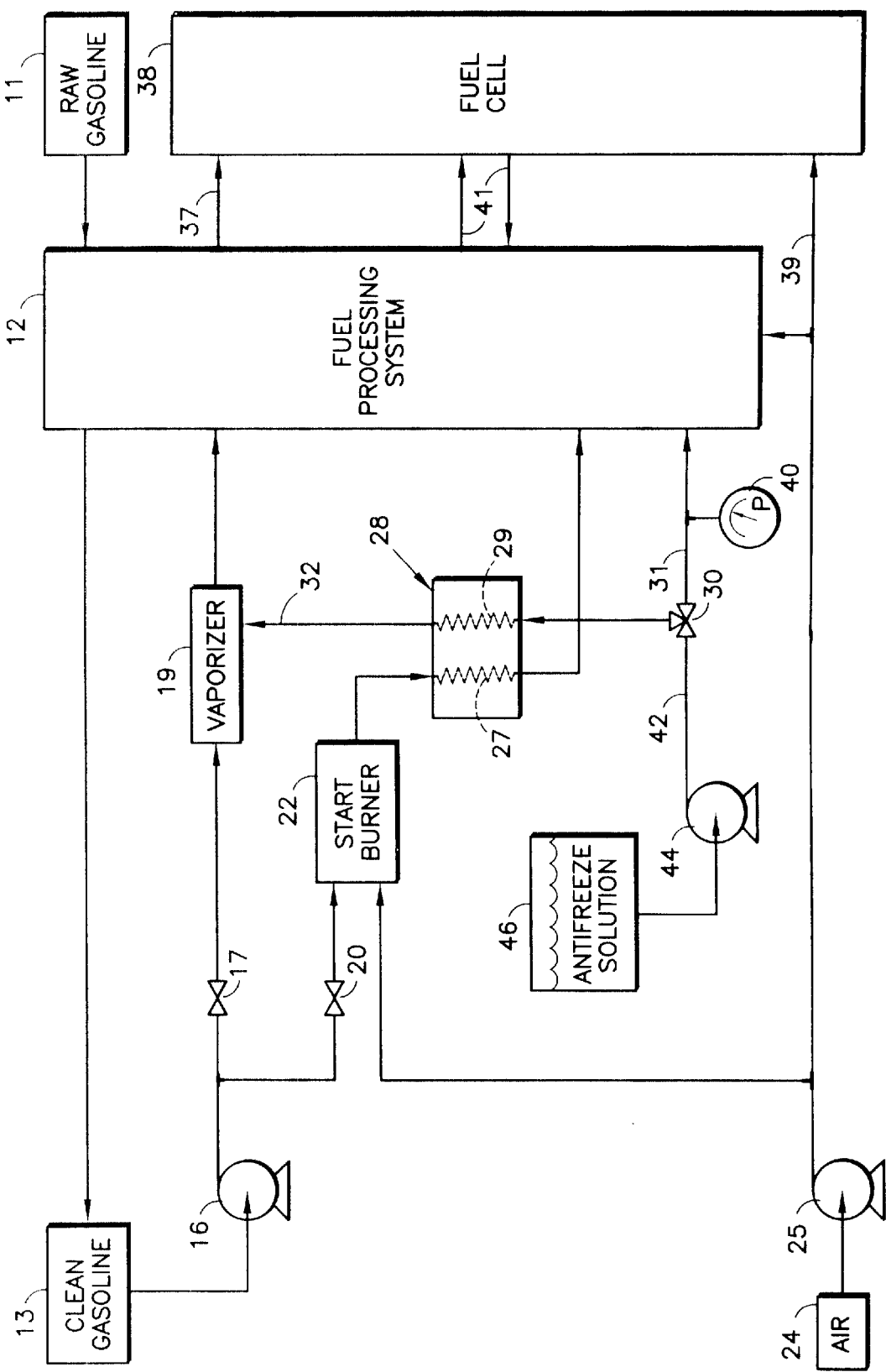

COLD STARTING OF GASOLINE FUELED FUEL CELL

TECHNICAL FIELD

This invention relates to fuel processing which converts gasoline to hydrogen for use as a fuel reactant in a fuel cell, and more particularly to use of an aqueous antifreeze solution, in place of fuel processing system steam, in the fuel vaporizer during startup when the temperature is below freezing.

BACKGROUND ART

It is known that a fuel processing system for a low temperature fuel cell consists of a desulfurizer, a reformer, a shift converter and a selective oxidizer. The desulfurizer removes sulfur compounds from the fuel, the reformer reacts the fuel with water/steam and sometimes air to produce mainly hydrogen, carbon dioxide and carbon monoxide, the shift reactor reacts water/steam with carbon monoxide to produce hydrogen and carbon dioxide, and the selective oxidizer oxidizes the carbon monoxide with oxygen to produce carbon dioxide. Three primary types of reformers in current use include a steam reformer, an auto-thermal reformer and a partial oxidation reformer. The steam reformer, auto-thermal reformer and shift converter require water for the reactions to occur; the partial oxidation reformer does not use water. The auto-thermal reformer and the partial oxidation reformer also require air as a reactant.

The residual water inventory of a polymer electrolyte membrane fuel cell power plant may be on the order of several gallons. It requires many minutes to thaw such a quantity of ice. Fuel cell power plants utilized for vehicles have an objective to be started in about ten seconds. In colder climates, fuel cell power plants utilized in vehicles will require startup at sub-freezing temperatures. In any gasoline fuel processing system, steam must be provided to the vaporizer to vaporize the gasoline as a first step of the process. However, there is no method of storing water in the fuel cell power plant for use in the fuel processor that prevents the water from freezing.

DISCLOSURE OF INVENTION

Objects of the invention include: provision of a source of unfrozen water for use in the vaporizer of a gasoline fuel processing system; provision of a fuel cell power plant that can start in seconds in sub-freezing temperatures; and a fuel cell power plant suitable for use in vehicles, that can start quickly in sub-freezing temperatures.

According to the present invention, an aqueous antifreeze solution is substituted for the normal water input to a start-up heat exchanger that provides steam to the gasoline vaporizer within the gasoline fuel processing system. According to the invention, the aqueous antifreeze solution is converted to steam in the start-up heat exchanger, and the antifreeze component cleanly decomposes within the reformer and shift converter of the gasoline fuel processing system. According to the invention, suitable antifreeze solutions are: methanol-water, ethanol-water, glycerol-water, ethylene glycol-water and propylene glycol-water. Preferably these solutions are free of commonly-used additives and stabilizers.

The invention provides quick start-up of a fuel processing system suitable for use in vehicles powered by gasoline fueled fuel cell power plants.

Other objects, features and advantages of the present invention will become more apparent in the light of the following detailed description of exemplary embodiments thereof, as illustrated in the accompanying drawing.

BRIEF DESCRIPTION OF THE DRAWINGS

The sole figure herein is a schematic illustration of a gasoline fueled fuel cell power plant, illustrating details of the startup portion of the system.

MODES(S) FOR CARRYING OUT THE INVENTION

Referring to the figure, raw gasoline from a source 11 is desulfurized in a fuel processing system 12 to provide a supply 13 of sulfur-free gasoline by known methods, such as is disclosed in commonly owned U.S. Pat. No. 6,156,084. The sulfur-free gasoline is fed by a pump 16 through a shutoff valve 17 to a vaporizer 19, which is a conventional part of the fuel processing system 12. The pump 16 also supplies sulfur-free gasoline through a valve 20 to a conventional start burner 22, which also receives air from a suitable source of air 24 through an air pump 25. The exhaust of the start burner is fed to one element 27 of a startup heat exchanger 28. The other element 29 of the heat exchanger normally receives water/steam through a valve 30 and a line 31 from the fuel processing system 12. During startup, the water from line 31 is passed through the valve 30 and the element 29 where it is converted to steam; the steam is fed to the vaporizer 19 by a line 32 so as to vaporize gasoline to start the process of converting the gasoline into a hydrogen rich stream, in a conventional way. A pressure sensor 40 may sense the pressure of steam in the line 31, signifying the completion of startup, so the valve 20 may be closed, causing the start burner 22 to shut down. Then, in steady state operation, steam is passed from the valve 30 through the element 29, over the line 32 to the vaporizer 19. The fuel processing system provides a hydrogen rich stream on a line 37 to the fuel cell 38, which also receives air from the air pump 25 on a line 39.

The fuel cell produces product water and utilizes cooling water, as is known; the fuel processing system utilizes some of this water; water is exchanged between the fuel processing system 12 and the fuel cell 38 over lines 41. The operation of the fuel cell is conventional.

According to the invention, during startup, the valve 30 will cause the element 29 to receive an aqueous solution of antifreeze provided to the valve 30 over a line 42 by a pump 44 from a reservoir 46. During cold start-up, the aqueous antifreeze solution from the reservoir 46 is converted to steam with antifreeze components entrained therein, which is passed over line 32 to the vaporizer 19. The pressure sensor 40 may sense the presence of steam in the line 31, signifying the completion of startup. Then the selection valve 30 will transfer from the line 42 to the line 31 and the valve 20 will close, thereby causing the start burner 22 to shut down, as is conventional. The fuel vaporizer then responds to steam provided over the line 31 from the fuel processing system 12.

The invention is well suited for use in fuel processors which convert gasoline to a hydrogen rich stream for use in fuel cell power plants in vehicles. Antifreeze which is currently readily available at gasoline stations include ethylene glycol and propylene glycol which is sold as radiator antifreeze, and methanol, which is sold as dry gas. However, other antifreeze may be provided, if desired, examples of which are given hereinbefore. Although the invention is particularly well suited for use in vehicle power plants employing PEM fuel cells, the invention may be utilized in any fuel cell operating in a cold climate, utilizing any antifreeze solution which will decompose cleanly within the reformer and the shift converter.

The aforementioned patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A fuel cell power plant having a fuel processing system comprising:

a gasoline vaporizer for vaporizing gasoline from a source, a start burner consuming gasoline and air to provide a hot exhaust;

a heat exchanger, one element of said heat exchanger receiving said hot exhaust, a second element of said heat exchanger receiving water during startup from the fuel processing system to provide steam to said vaporizer, and after startup passing steam from said fuel processing system to said vaporizer;

characterized by the improvement comprising:

a source of aqueous antifreeze solution provided to said second element of said startup heat exchanger during startup as an alternative to water provided by said fuel processing system, thereby to permit starting said system at sub-freezing temperatures.

2. A method of starting a fuel cell power plant having a fuel processing system utilizing a gasoline vaporizer and having a start burner and a startup heat exchanger which receives water from the fuel processing system to provide startup steam to said vaporizer, said method comprising:

providing an aqueous antifreeze solution to said startup heat exchanger during startup in subfreezing temperatures.

* * * * *